United States Patent Office 2,824,883
Patented Feb. 25, 1958

2,824,883
AMIDE SYNTHESIS USING ANION EXCHANGE RESIN CATALYSTS

Mitchell F. Zienty, Elkhart, Ind., assignor to Miles Laboratories, Inc., Elkhart, Ind., a corporation of Indiana No Drawing. Application October 7, 1953
Serial No. 384,781

10 Claims. (Cl. 260—404)

This invention relates to the preparation of amides and more particularly to the preparation of amides by the condensation of aliphatic acids or aliphatic hydroxy acids with amines in the presence of certain catalysts.

It is known that aliphatic acids may be reacted with amines to produce amides, an example of such being, the reaction of a fatty acid with p-aminophenol to produce an N-acyl-p-aminophenol.

The reaction ordinarily results in the production of a dark colored reaction product, in low yield, and which is difficult to purify. When aliphatic hydroxy acids are used in lieu of the unsubstituted acids, the method is even more unsatisfactory because of objectionable side reactions which occur and which result in the formation of tars due to the loss of water from the hydroxy acids.

My invention has as an object the preparation of amides by means of a procedure wherein the reaction is rapid, leads to good yields of a reaction product having improved color quality, and which permits the use of reactants heretofore considered unsatisfactory and undesirable for condensing with amines, namely the aliphatic hydroxy acids.

The objects of this invention have been accomplished by condensing aliphatic acids including aliphatic hydroxy acids with compounds having a primary or secondary amine group, in the presence of certain catalysts.

Typical of the acid reactants which can be used in accordance with the present invention are the higher and lower aliphatic acids and the higher and lower hydroxy aliphatic acids.

The amine reactants which can be condensed with the aforesaid acids are exemplified by aniline, p-aminophenol, p-toluidine, diethyl amine, n-butyl amine, lauryl amine, benzyl amine, dibenzyl amine, benzyl methyl amine, cyclohexyl amine, dicyclohexyl amine and the like.

The condensing agent is an anion exchange resin.

The anion exchange resins used in practicing the process of the present invention are typified by Amberlite IRA-400 and Amberlite XE-81. These products are described in the Cyclopedia of Chemical Technology, volume 8, page 7, Interscience Publishers Inc., 1952, and are there referred to as being ion exchange substances which may be considered as highly insoluble polyelectrolytes in which one of the ionic constituents is a high molecular weight cross-linked non-diffusible structure whose charges are balanced by small diffusible ions of opposite charge.

The basic character of the anion exchange resins is derived from polyamines or quaternary ammonium groups. Amberlite IRA-400 is this type resin and its structure may be shown schematically as follows:

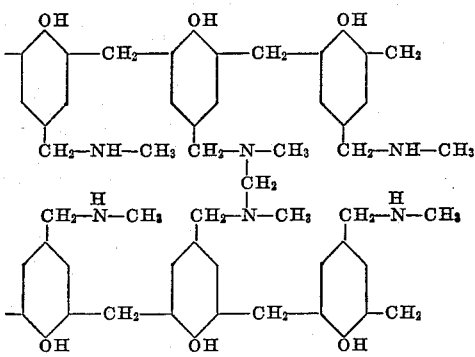

Amberlite XE-81 resin is a mixture of cation and anion exchange resin. The anion portion is IRA-400 which has been described above, while the cation resin is a sulfonic acid containing a compound possessing the groups $RSO_3H$ or $RCH_2SO_3H$. The structure of this cation resin may be illustrated as follows:

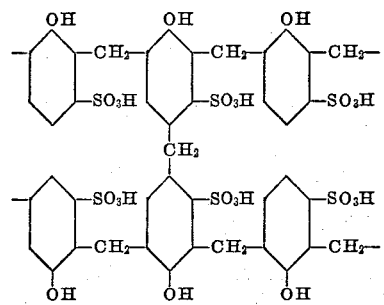

The following examples will serve to illustrate the invention, although it is to be understood that the invention is not limited to these or to any particular examples.

Example 1

A one-liter, three necked flask was fitted with a stirrer, thermometer, Dean-Starke water trap and condensor, and charged with 54.5 grams of p-aminophenol, 100 grams of coconut oil fatty acids and 36 grams of toluene. The batch was heated to vigorous reflux with stirring. At the end of 9¼ hours, 6 ml. of water was collected. Heating for an additional 1½ hours produced no more water.

Example 2

The procedure of Example 1 was repeated except that 3 grams of Amberlite IRA-400, an amine type anion exchange resin sold by Rohm and Haas Co. of Philadelphia, Pa., was added to the flask along with the other reactants. The resin was washed with sodium hydroxide solution and then with water until neutrality. At the end of 8 hours of refluxing with stirring, 7.7 ml. of water was collected. At this time an additional 2 grams of the resin was added, the refluxing continued, and another 0.5 ml. of water collected during the next hour, making a total of 8.2 ml. collected in the period of 9 hours.

Example 3

A mixture of 54.5 grams of p-aminophenol and 74 grams (85%) lactic acid in 150 cc. of toluene was azeotropically dehydrated using 2 grams of Amberlite XE-81, a mixed bed sulfonic acid amine type ion exchange resin, sold by Rohm and Haas Co., Philadelphia, Pa., as the catalyst. The water was collected in a Dean-Starke trap and in 2 hours 20.5 cc. were collected. The reaction was cooled and the toluene decanted. The dark colored residue was dissolved in 100 cc. of hot water and treated with a small amount of sodium hydrosulfite; on cooling, pinkish crystals were obtained. These were collected by suction filtration, washed with ice-cold water and oven dried. The product weighed 40 grams; M. P. 135–137° C.

*Example 4*

A mixture of 74 grams of lactic acid (85%) and 150 ml. of toluene was refluxed under a water trap to dehydrate the acid of residual water, about 11 ml. of water being collected. The reaction mix was then cooled, 54.5 grams of p-aminophenol added and water again collected under reflux. In six hours 9 ml. of water was collected. The reaction was cooled and the toluene decanted from the lower layer. Crude N-lactyl-p-aminophenol was dissolved in 50 cc. of boiling water, treated with a small amount of sodium hydrosulfite. After cooling 30 grams of pink colored crystals melting at 135–138° C. was obtained.

*Example 5*

In a resin flask equipped with a stirrer, a Dean-Starke trap surmounted by a reflux condensor and a thermometer, there was placed 109 parts by weight of p-aminophenol, 200 parts by weight of coconut oil fatty acid having a molecular weight of 228 and consisting principally of lauric acid, 72 parts by weight of toluene and 10 parts by weight of Amberlite XE-81 ion exchange resin. With stirring, the mixture was heated and the water removed azeotropically in the Dean-Starke trap. The toluene was removed by vacuum distillation and there was then added 500 ml. of 99% isopropanol. The solution was refluxed and filtered to remove the anion exchange resin. The solution was then again heated to reflux and with stirring there was added slowly with cooling 500 ml. of water. N-lauroyl-p-aminophenol precipitated as a light colored crystalline solid. The N-lauroyl-p-aminophenol was collected on a centrifuge, washed with 40% cold aqueous isopropanol and then with water and the product dried in an oven at 70–80° C. Yield of N-lauroyl-p-aminophenol obtained was 253 grams; M. P. 125° C.

In connection with the above examples it is to be borne in mind that the Amberlite IRA-400 resin should be washed with sodium hydroxide solution and then with water until neutrality since this resin as commercially obtained is in the form of the hydrochloride.

While in the above examples toluene is the preferred entraining agent it is to be understood of course, that other entraining liquids can be used, such as xylene, kerosene and similar hydrocarbons, providing that they have the requisite boiling points.

Practice of the process of present invention, which is characterized by the use of an anion exchange resin as a condensation catalyst increases the yield of the condensation product, results in the production of a condensation product having improved color, and increases the speed of the reaction. The latter characteristic is of particular importance for example, where readily sublimable amines, like p-aminophenol are used.

Another particularly important advantage of the present invention lies in the fact that, with the use of anion exchange resin as condensation catalyst, it is now possible to effect a practical condensation of a primary or secondary amine with either a higher or lower hydroxy fatty acid.

It is to be understood that the following claims are intended to cover all of the generic and specific features of the invention herein described, and all statements of the scope of the invention which, as a matter of language, might be said to fall therebetween.

I claim:

1. A process for producing amides which comprises condensing, in the presence of an anion exchange resin, an amine with an aliphatic acid.

2. A process for producing an amide which comprises condensing, in the presence of an anion exchange resin, an amine with an aliphatic hydroxy acid.

3. A process for producing an amide which comprises condensing, in the presence of an anion exchange resin, a primary amine with an aliphatic acid.

4. A process for producing an amide which comprises condensing, in the presence of an anion exchange resin, a secondary amine with an aliphatic acid.

5. A process according to claim 3 wherein the acid is a hydroxy acid.

6. A process according to claim 4 wherein the acid is a hydroxy acid.

7. A process for producing an amide which comprises condensing, in the presence of an anion exchange resin, p-aminophenol and lactic acid and separating the resulting N-lactyl-p-aminophenol.

8. A process for producing an amide which comprises condensing, in the presence of an anion exchange resin, p-aminophenol and lauric acid and separating N-lauroyl-p-aminophenol from the reaction mixture.

9. A process for producing amides which comprises condensing an amine with an aliphatic acid in the presence of an anion exchange resin having a basic character derived from a member of the group consisting of polyamines and quaternary ammonium compounds.

10. A process for producing amides which comprises condensing an amine with an aliphatic acid in the presence of an anion exchange resin having the following structure:

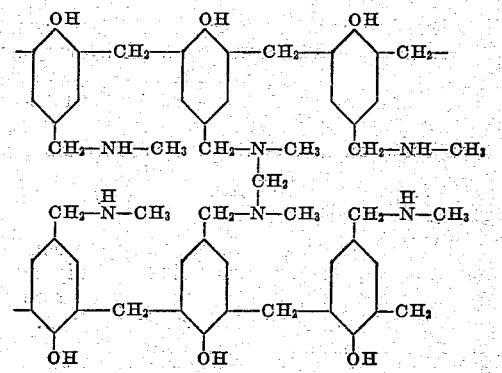

References Cited in the file of this patent

UNITED STATES PATENTS

| | | |
|---|---|---|
| 1,954,433 | Thomas et al. | Apr. 10, 1934 |
| 2,058,013 | Henke et al. | Oct. 20, 1936 |
| 2,440,349 | Schaeffer | Apr. 27, 1948 |

OTHER REFERENCES

Galat: J. A. C. S., vol. 70, November 1948, page 3945.

Resinous Reporter, vol. IX, No. 4, July 1948, pp. 5, 9 and 11.

Chemical and Engineering News, page 557, Feb. 21, 1949.

Rohm and Haas Co.: "Laboratory Manual Bulletin"; "Amerlite FR A410," March 1950, 6 pages; 2 pages appendix.

Schmidle et al.; Ind. & Eng. Chem., vol. 44, June 1952, pp. 1388–90.

Carsten et al.; J. A. C. S., vol 74, December 1952, pp. 5950–4.